United States Patent [19]

Sangregory et al.

[11] Patent Number: 5,895,125
[45] Date of Patent: Apr. 20, 1999

[54] ONE-TIME-USE CAMERA CAN ONLY BE USED WITH MODIFIED FILM CARTRIDGE, TO PREVENT UNAUTHORIZED REUSE WITH STANDARD FILM CARTRIDGE

[75] Inventors: Jude A. Sangregory, Spencerport; Edgar G. Earnhart, Hilton; Joseph C. Weiser, Rochester, all of N.Y.

[73] Assignee: Eastman Kodak Company, Rochester, N.Y.

[21] Appl. No.: 08/862,205

[22] Filed: May 22, 1997

[51] Int. Cl.[6] ............................. G03B 17/24
[52] U.S. Cl. ................................... 396/6
[58] Field of Search .......................... 396/6

[56] References Cited

U.S. PATENT DOCUMENTS

| | | |
|---|---|---|
| 1,263,228 | 4/1918 | Goddard, et al. . |
| 3,490,348 | 1/1970 | Ariyasu et al. . |
| 4,077,041 | 2/1978 | Imura . |
| 4,650,304 | 3/1987 | Harvey . |
| 4,928,900 | 5/1990 | Beery . |
| 5,187,514 | 2/1993 | Ikenoue . |
| 5,280,237 | 1/1994 | Stoneham et al. . |
| 5,349,410 | 9/1994 | Kamata . |

*Primary Examiner*—David M. Gray
*Attorney, Agent, or Firm*—Roger A. Fields

[57] ABSTRACT

A one-time-use camera comprising a main body part having a chamber, and a film cartridge adapted to be located in a predetermined position within the chamber, is characterized in that the film cartridge is a modified cartridge as compared to a standard cartridge, because it has a recess that is not on the standard cartridge, and the main body part has a blocking protuberance that projects into the chamber to fit in the recess when the modified cartridge is located in the predetermined position within the chamber, but which will abut the standard cartridge to prevent it from being located in the predetermined position within the chamber if one attempts to substitute the standard cartridge for the modified cartridge, and which has a hollowed-out space that will allow ambient light to leak into the chamber should one cut the protuberance off the main body part at the hollowed-out space in order to permit the standard cartridge to be located in the predetermined position within the chamber.

12 Claims, 6 Drawing Sheets

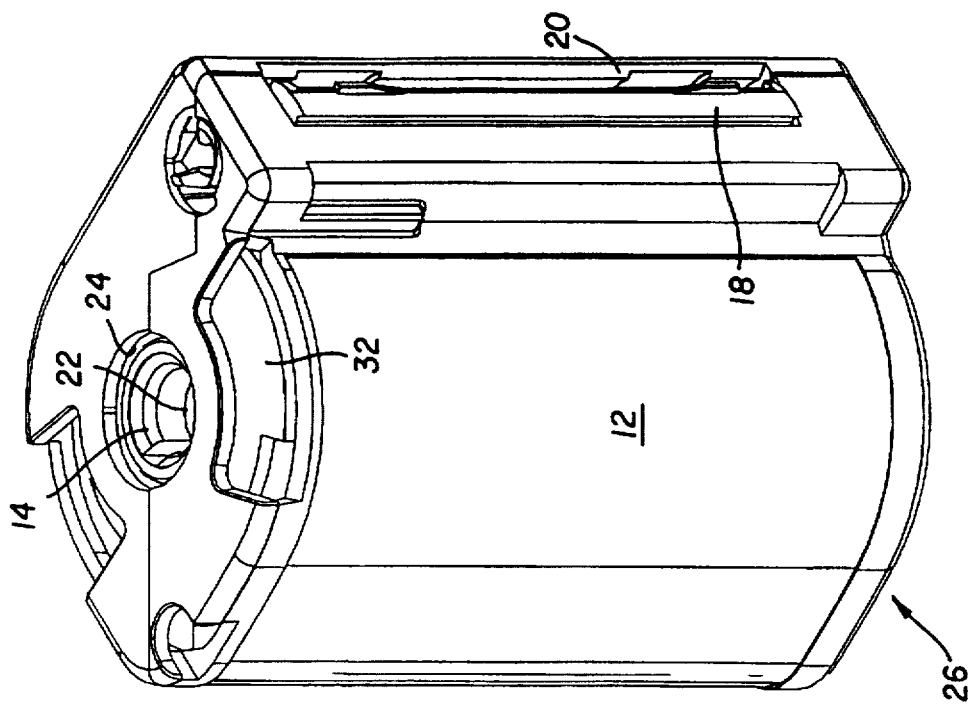
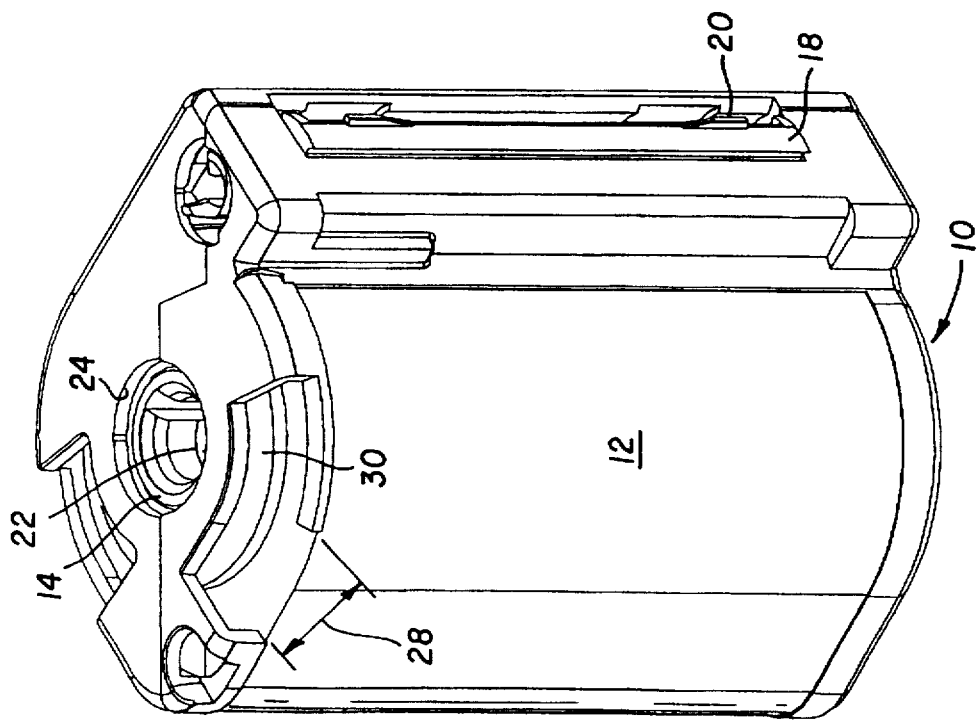

ONE-TIME-USE CAMERA CAN ONLY BE USED WITH MODIFIED FILM CARTRIDGE, TO PREVENT UNAUTHORIZED REUSE WITH STANDARD FILM CARTRIDGE

CROSS-REFERENCE TO RELATED APPLICATIONS

Reference is made to commonly assigned copending applications Ser. No. 08/861,585, entitled METHOD OF REMANUFACTURING ONE-TIME-USE CAMERA and filed May 22, 1997 in the names of Jude A. SanGregory, Edgar G. Earnhart and Joseph C. Weiser, and Ser. No. 08/861,876, entitled FRANGIBLE PORTION OF ONE-TIME-USE CAMERA MUST BE BROKEN TO OPEN CAMERA, WHICH LEAVES HOLE TO DISCOURAGE UNAUTHORIZED RECYCLING and filed May 22 1997 in the name of Bernd Wagner.

FIELD OF THE INVENTION

The invention relates generally to the field of photography, and in particular to one-time-use cameras. More specifically, the invention relates to a one-time-use camera that can only be used with a modified or special film cartridge, to prevent unauthorized reuse of the camera with a standard film cartridge.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each time a picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting, and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from a fresh cartridge is attached to the film take-up spool, the fresh cartridge and the film take-up spool are loaded into the cartridge receiving and film supply chambers, and an intermediate leader section which bridges the film take-up spool and the fresh cartridge is engaged with the metering sprocket. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the fresh cartridge onto the film take-up spool and to rotate the metering sprocket to increment the frame counter to its total-available frame number setting. Lastly, the outer box or label is placed on the camera unit.

Prior Art Problem

There is a need recognized in the industry to prevent unauthorized recycling (remanufacturing) of one-time-use cameras in order to maintain camera quality. Unauthorized recycled cameras may be of lesser quality than authorized recycled cameras because the reused parts may be worn or damaged. This problem is further described in U.S. Pat. No. 5,452,033 issued Sept. 19, 1995 and No. 5,235,366 issued Aug. 10, 1993.

One example of a possible solution to the problem is disclosed in prior art U.S. Pat. No. 5,349,410 issued Sep 20, 1994. This patent suggests as a way to prevent unauthorized recycling that an anti-backup pawl for the thumbwheel be broken when the rear cover part is separated from the main body part to obtain the film cartridge from the cartridge receiving chamber. The rear cover part has a projecting hook that extends through a hole in the anti-backup pawl to engage the pawl. The anti-backup pawl is connected to the main body part at a location which includes a weakened notch section. Thus, separating the rear cover part from the main body part breaks the anti-backup pawl away from the main body part at the weakened notch section.

Another example of a possible solution to the problem is for the rear cover part to have an integral door portion that is to be opened to remove the film cartridge from the cartridge receiving chamber and to have a grooved line of weakness between the door portion and a remaining portion of the rear cover part. The grooved line of weakness forms a living hinge between the door portion and the remaining portion of the rear cover part which tends to fracture when the door portion is opened. The fracture allows the door portion to be readily separated from the remaining portion of the rear cover part, to leave a large opening to the main body part which allows ambient light to enter the cartridge receiving chamber. The fracture, often however, may not be sufficient to readily separate the door portion from the remaining portion of the rear cover part. Consequently, the rear cover part might be reused, provided an opaque tape is adhered to the fractured line of weakness to prevent any possible light leak.

The Cross-Referenced Applications

Cross-referenced application Ser. No. 08/861,876 discloses a further example of a possible solution to the problem. In this instance, a continuous line of weakness circumscribes a predetermined portion of either the main body part or one of the front or rear cover parts to permit the predetermined portion to be broken away from the main body part or cover part along the continuous line of weakness and leave a hole in the main body part or cover part in the place of the predetermined portion. The cover part is connected to the main body part at the predetermined portion to cause the predetermined portion to be broken away from the main body part or cover part when the main body part and the cover part are forcibly pulled apart.

Cross-referenced application Ser. No. 08/861,585 discloses a method of remanufacturing the one-time-use camera disclosed in this application.

SUMMARY OF THE INVENTION

According to the invention, a one-time-use camera comprising a main body part having a chamber, and a film cartridge adapted to be located in a predetermined position within the chamber, is characterized in that:

the film cartridge is a modified cartridge as compared to a standard cartridge, because it has a recess that is not on the standard cartridge; and the main body part has a blocking protuberance that projects into the chamber to fit in the recess when the modified cartridge is located in the predetermined position within the chamber, but which will abut the standard cartridge to prevent it from being located in the predetermined position within the chamber if one attempts to substitute the standard cartridge for the modified cartridge, and which has a hollowed-out space that will allow ambient light to leak into the chamber should one cut the protuberance off the main body part at the hollowed-out space in order to permit the standard cartridge to be located in the predetermined position within the chamber.

Preferably, a functional element capable of performing a particular function for the camera, for example an anti-backup pawl, is connected to the main body part within the hollowed-out space to be disconnected from the main body part in order to be disabled when one cuts the protuberance off the main body part at the hollowed-out space.

BRIEF DESCRIPTION OF THE DRAWINGS

FIG. 3 is a top perspective view of a modified film cartridge included in the one-time-use camera;

FIG. 4 is a top perspective view of a standard film cartridge not to be included in the one-time-use camera;

DETAILED DESCRIPTION OF THE INVENTION

Figure 1:
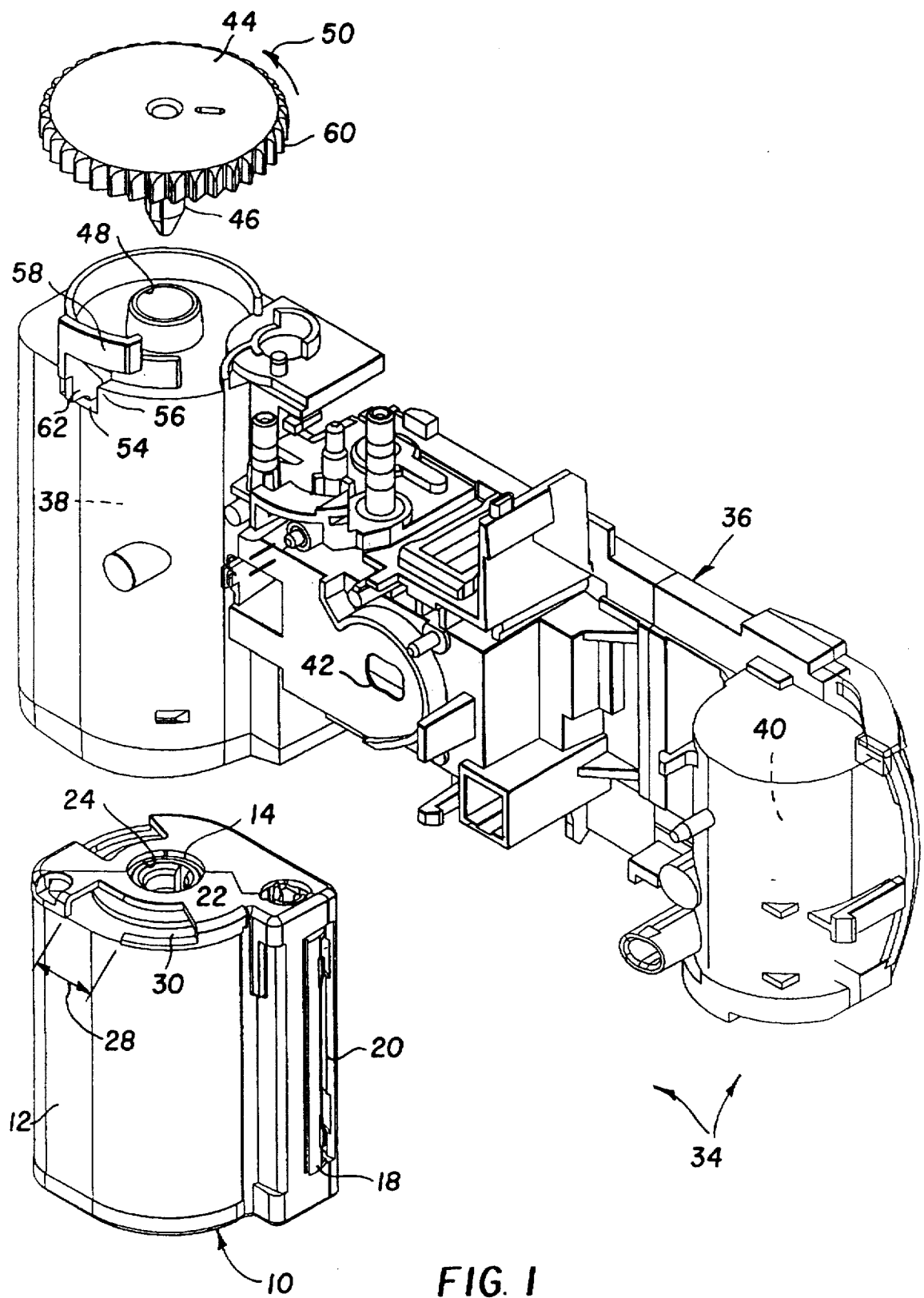
FIG. 1 is a front exploded perspective view of the one-time-use camera pursuant to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1, 2, 3 and 6 show a modified Advanced Photo System (APS) film cartridge 10, which is smaller than a conventional 35mm film cartridge. The modified film cartridge 10 is similar in operation to ones disclosed in prior art U.S. Pat. No. 5,357,303 issued Oct. 18, 1994 and No. 5,231,438 issued Jul. 27, 1993. The modified film cartridge 10 includes a shell 12 that contains a film spool 14 on which is to be wound an exposed filmstrip 16. A light lock 18 is supported within a film slot 20 in the shell 12 to be pivoted open to permit film movement through the slot and into the shell, and to be pivoted closed to prevent ambient light from entering the shell through the slot. The film spool 14 has a coaxial drive cavity 22 accessible through a top circular opening 24 in the shell 12. All of these features of the modified film cartridge 10 are the same as a standard APS film cartridge 26 shown in FIGS. 4 and 7. The modified film cartridge 10 differs from the standard film cartridge 26 in that the shell 12 of the modified film cartridge has a top recess or cut-out 28 which is not in the shell 12 of the standard film cartridge. See FIGS. 3 and 4. Also, the film spool 14 of the modified film cartridge 10 has a data disk supporting flange 30 that is radially shortened as compared to a data disk supporting flange 32 of the film spool 30 of the standard film cartridge 26.

Figure 2:
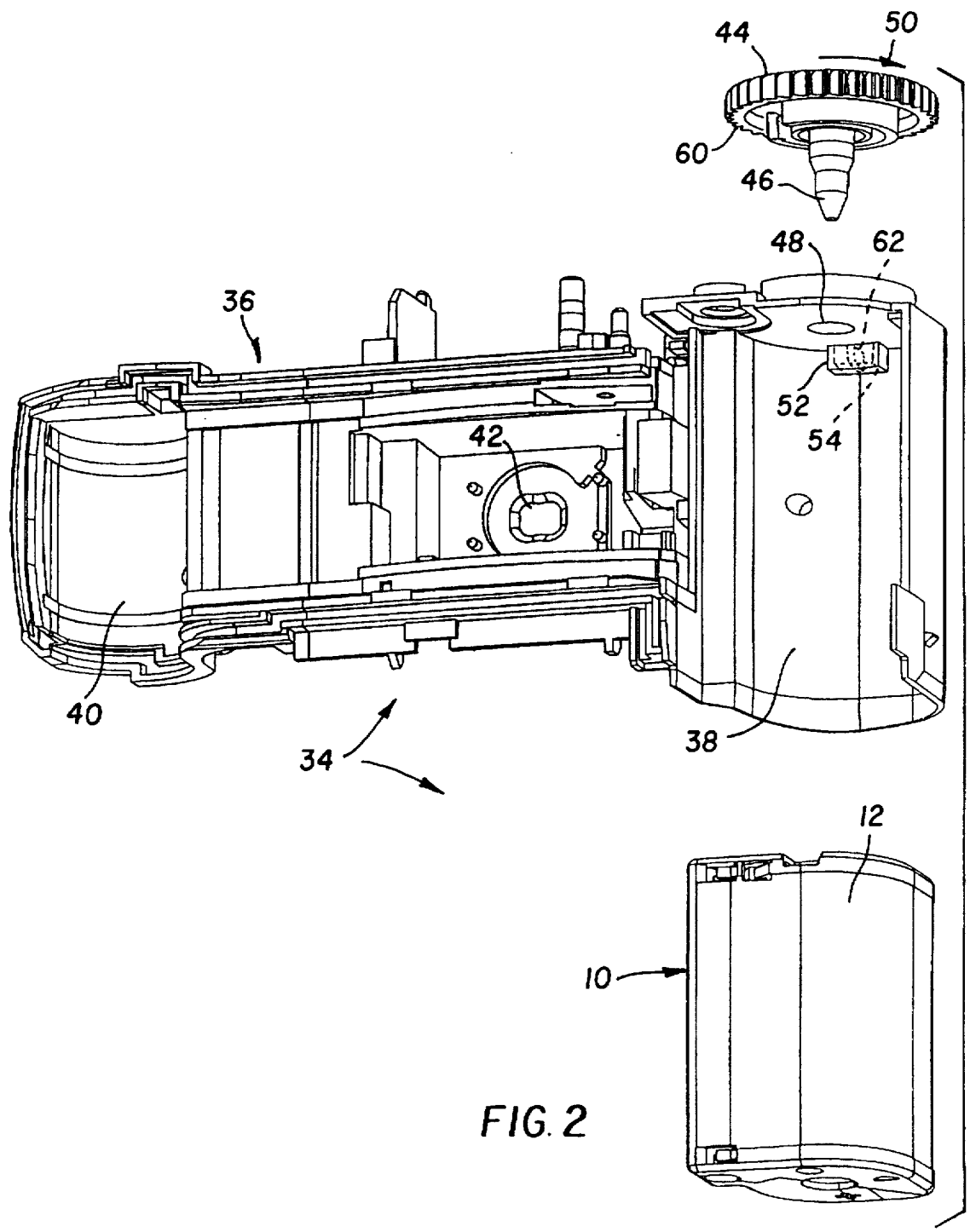
FIG. 2 is a rear exploded perspective view of the one-time-use camera.
Figure 5:
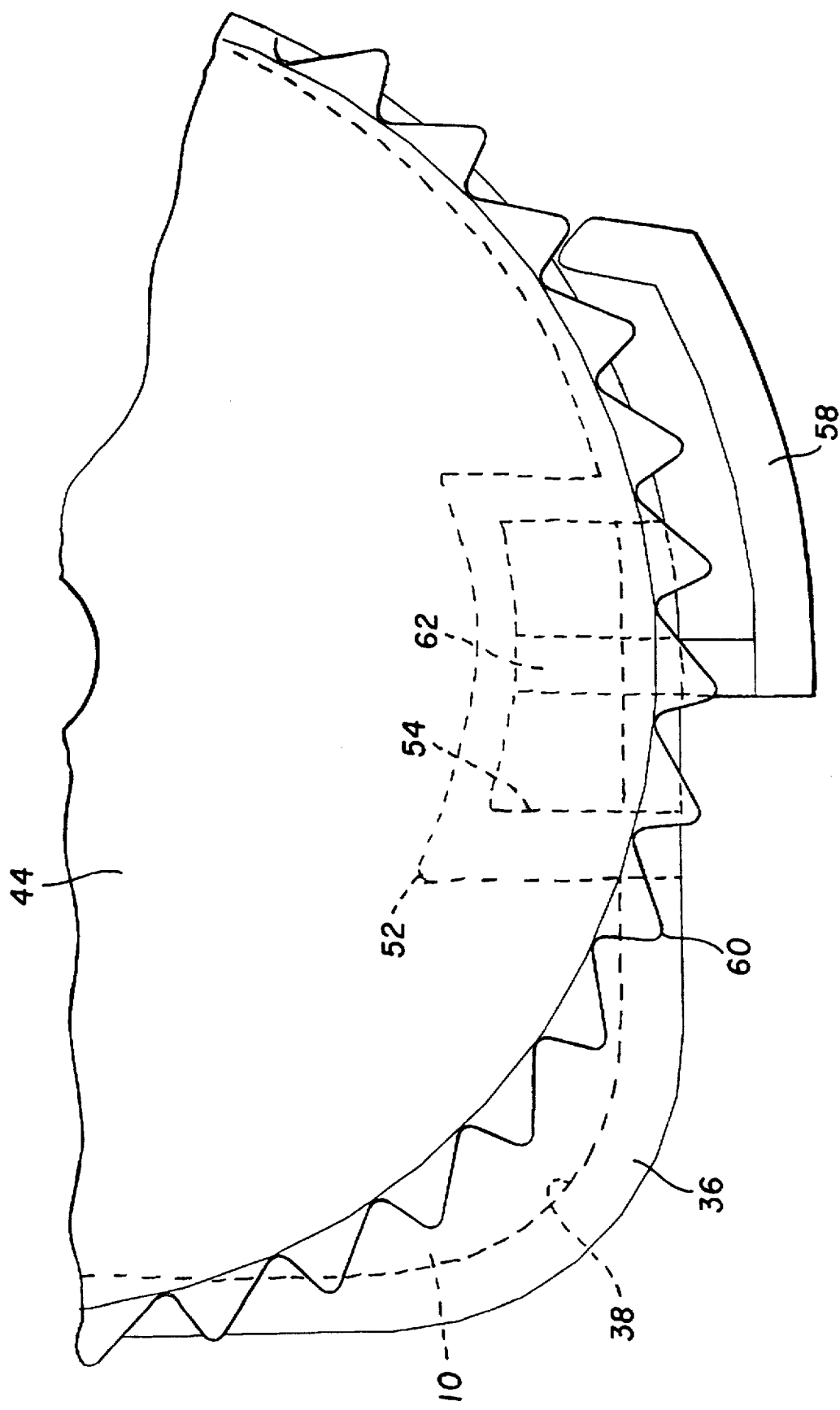
FIG. 5 is a top plan view of a limited portion of the one-time-use camera.
Figure 6:
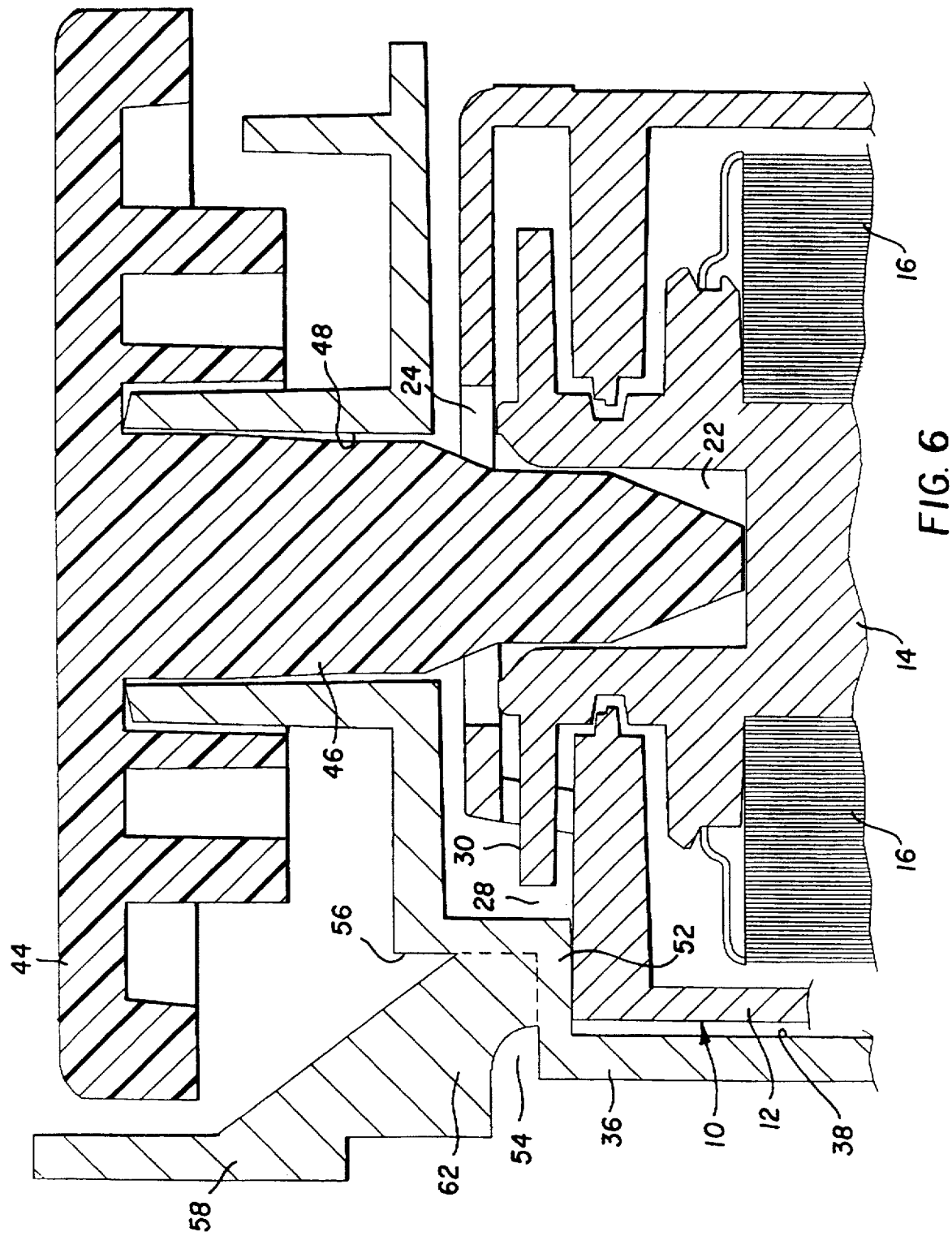
FIG. 6 is an elevation section view of the limited portion shown in FIG. 3, and including the modified film cartridge.

A partially shown one-time-use camera 34 which includes the modified film cartridge 10 (and is not intended to include the standard film cartridge 26) is depicted in FIGS. 1, 2, 5 and 6. A main body part 36 of the camera 34 has a cartridge receiving chamber 38 for the modified film cartridge 10, an unexposed film roll chamber 40 and an exposure aperture 42. As shown in FIGS. 2 and 6, the modified film cartridge 10 is located in the cartridge receiving chamber 38 in a predetermined position. A film winder wheel 44 has a depending coaxial stem 46 that extends through a top circular opening 48 in the main body part 36 and into the drive cavity 22 in the film spool 14 of the modified film cartridge 10 to coaxially engage the film spool. After each time a picture is taken with the camera 34, the photographer manually rotates the film winder wheel 44 in a film winding direction 50 to similarly rotate the film spool 14. This winds an exposed section of the filmstrip 16 into the shell 12 of the modified film cartridge 10.

A blocking protuberance 52 integrally formed with the main body part 36 projects into the cartridge receiving chamber 38 to fit in the top recess 28 in the shell 12 of the modified film cartridge 10 when the modified film cartridge is located in the predetermined position within the cartridge receiving chamber. See FIGS. 1, 2, 5 and 6. The blocking protuberance 52 will about the shell 12 of the standard film cartridge 26 to prevent the standard film cartridge from being located in the predetermined position within the cartridge receiving chamber 38 if one attempts to substitute the standard film cartridge for the modified film cartridge 10. This is because the shell 12 of the standard film cartridge 26 does not have the top recess 28.

Figure 7:
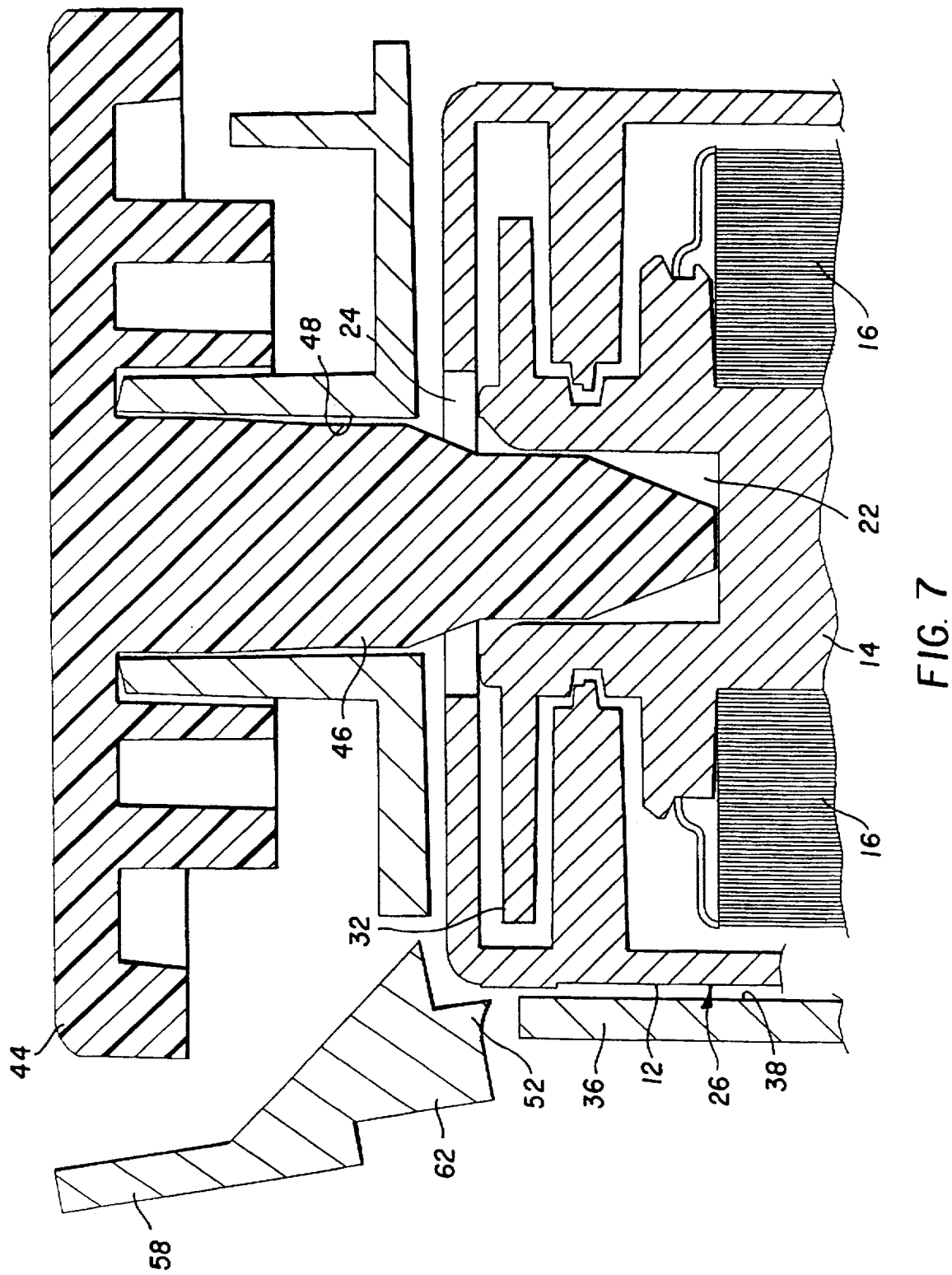
FIG. 7 is an elevation section view of the limited portion shown in FIG. 3, and including the standard film cartridge.

The blocking protuberance 52 has a hollowed-out space 54 that is open at an exterior portion 56 of the main body part 36 as shown in FIGS. 1 and 2. The blocking portion 52 can be cut off the main body part 12 at the hollowed-out space 54, as shown in FIG. 7, in order to provide a clearance space for the standard film cartridge 26 to be located in the predetermined position within the cartridge receiving chamber 38. However, a problem results in that this will allow ambient light to leak through a hole resulting in the cartridge receiving chamber 38.

One can plug, cover or otherwise close the hole to recycle (remanufacture) the main body part 12, but it is preferable in order to maintain quality to replace the spent body part with a fresh suitable body part during recycling of the one-time-use camera 34.

An anti-backup pawl 58 is provided for engaging successive peripheral teeth 60 of the film winder wheel 44 to prevent rotation of the film winder wheel in a reverse direction opposite to the film winding direction 50. See FIGS. 1, 2, 5 and 6. The anti-backup pawl 58 has a base portion 62 integrally formed with the main body part 36 within the hollowed-out space 54 to be disconnected from the main body part in order to be disabled when one cuts the protuberance 52 off the main body part at the hollowed-out space as shown in FIG. 7.

The invention has been described with reference to a preferred embodiment. However, it will be appreciated that variations and modifications can be effected by a person of ordinary skill in the art without departing from the scope of the invention. For example, instead of the anti-backup pawl 58 being disabled when one cuts the protuberance 52 off the main body part at the hollowed-out space as shown in FIG. 7, other known functional elements capable of performing a known camera function can be disabled when the protuberance is cut off the main body part at the hollowed-out space.

PARTS LIST 10. modified film cartridge
12. shell
14. film spool
16. filmstrip
18. light lock
20. film slot
22. drive cavity
24. top circular opening
26. standard film cartridge
28. top recess or cut-out
30. data disk supporting flange
32. data disk supporting flange
34. one-time-use camera
36. main body part
38. cartridge receiving chamber
40. unexposed film roll chamber
42. exposure aperture
44. film winder wheel
46. depending coaxial stem
48. top circular opening
50. film winding direction
52. blocking protuberance
54. hollowed-out space
56. exterior portion
58. anti-backup pawl
60. peripheral teeth
62. base portion

What is claimed is:

1. A one-time-use camera comprising a main body part having a chamber, and a film cartridge adapted to be located in a predetermined position within said chamber, is characterized in that:

said film cartridge is a first-type cartridge as compared to a second-type cartridge, because it has a recess that is not on the second-type cartridge; and said main body part has a blocking protuberance that projects into said chamber to fit in said recess when said first-type cartridge is located in the predetermined position within the chamber, but which is configured to abut the second-type cartridge to prevent it from being located in the predetermined position with in the chamber if one attempts to substitute the second-type cartidge for the first-type cartridge, and which has a hollowed-out space that is constructed to allow ambient light to leak into the chamber should one cut only said protuberance off the main body part at said hollowed-out space in order to permit the second-type cartridge to be located in the predetermined position within the chamber.

2. A one-time-use camera as recited in claim 1, wherein said main body part and said protuberance are integrally formed to be a single piece.

3. A one-time-use camera as recited in claim 1, wherein a functional element capable of performing a particular function for said camera is connected to said main body part within said hollowed-out space to be disconnected from the main body part in order to be disabled when one cuts only said protuberance off the main body part at the hollowed-out space.

4. A one-time-use camera as recited in claim 1, wherein a film winder wheel is rotatable in a film winding direction, and an anti-backup pawl for engaging said film winder wheel to prevent rotation of the film winder wheel in a reverse direction opposite to the film winding direction has a base portion that is connected to said main body part within said hollowed-out space to be disconnected from the main body part in order to be disabled when one cuts only said protuberance off the main body part at the hollowed-out space.

5. A one-time-use camera as recited in claim 4, wherein said main body part, said protuberance and said anti-backup pawl are integrally formed to be a single piece.

6. A one-time-use camera comprising a main body part having a chamber, and a film cartridge adapted to be located in a predetermined position within said chamber, is characterized in that:

said film cartridge is a first-type cartridge as compared to a second-type cartridge, because it has a recess that is not on the second-type cartridge; and said main body part has a blocking protuberance that projects into said chamber to fit in said recess when said first-type cartridge is located in the predetermined position within the chamber, but which is configured to abut the second-type cartridge to prevent it from being located in the predetermined position within the chamber if one attempts to substitute the second-type cartridge for the first-type cartridge, and which is constructed to allow it to be cut off the main body part, without further cutting the main body part, to provide a clearance space for the second-type cartridge to be located in the predetermined position within the chamber; and a functional element capable of performing a particular function for said camera is connected to said protuberance to be separated from said main body part in order to be disabled should one cut only the protuberance off the main body part to provide the clearance space.

7. A one-time-use camera as recited in claim 6, wherein a film winder wheel is rotatable in a film winding direction, and said functional element constitutes an anti-backup pawl for engaging said film winder wheel to prevent rotation of the film winder wheel in a reverse direction opposite to the film winding direction.

8. A one-time-use camera as recited in claim 7, wherein said main body part, said protuberance and said anti-backup pawl are integrally formed to be a single piece.

9. A one-time-use camera as recited in claim 6, wherein said protuberance has a hollowed-out space at which the protuberance is cut off said main body part, and said functional element is connected to said protuberance within said hollowed-out space.

10. A main body part for a one-time-use camera has a chamber adapted to receive a film cartridge to be located in a predetermined position within said chamber, and is characterized by:

a blocking protuberance that projects into said chamber to fit in a recess of a first-type cartridge when that cartridge is located in the predetermined position within the chamber, but which is configured to abut a second-type cartridge without the recess to prevent that cartridge from being located in the predetermined position within the chamber if one attempts to substitute that cartridge for the first-type cartridge, and which has a hollowed-out space that is constructed to allow ambient light to leak into the chamber should one remove only said protuberance from the main body part at said hollowed-out space in order to permit the second-type cartridge to be located in the predetermined position within the chamber.

11. A main body part for a one-time-use camera has a chamber adapted to receive a film cartridge to be located in a predetermined position within said chamber, and is characterized by:

a blocking protuberance that projects into said chamber to fit in a recess of a first-type cartridge when that cartridge is located in the predetermined position within the chamber, but which is configured to abut a second-type cartridge without the recess to prevent that cartridge from being located in the predetermined position within the chamber if one attempts to substitute that cartridge for the first-type cartridge, and which is constructed to allow it to be removed from the main body part, without further cutting the main body part, to provide a clearance space for the second-type cartridge to be located in the predetermined position within the chamber and a functional element that performs a particular function for the camera is connected to said blocking protuberance to be separated with said protuberance from said main body part in order to be disabled should one remove only the protuberance from the main body part to provide the clearance space.

12. A one-time-use camera as recited in claim 11, wherein said functional element constitutes an anti-backup pawl for engaging a film winder wheel to prevent rotation of the film winder wheel in a reverse direction opposite to a film winding direction.

* * * * *